Figure 1:
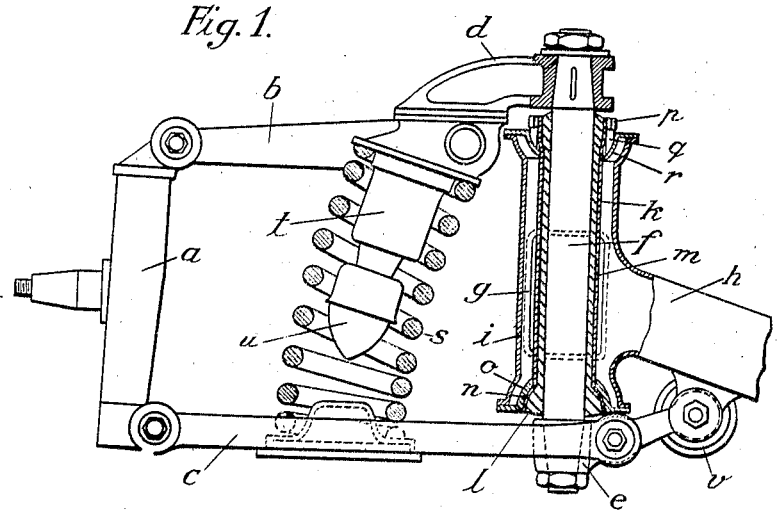

Jan. 4, 1944.  S. WULFF  2,338,478

INDEPENDENT WHEEL SUSPENSION

Filed March 1, 1941

INVENTOR
Siegfried Wulff
BY
ATTORNEYS

Patented Jan. 4, 1944

2,338,478

UNITED STATES PATENT OFFICE 2,338,478

INDEPENDENT WHEEL SUSPENSION

Siegfried Wulff, Stuttgart-Bad Cannstatt, Germany; vested in the Alien Property Custodian Application March 1, 1941, Serial No. 381,312
In Germany February 7, 1940

7 Claims. (Cl. 267—20)

The present invention relates to an independent wheel suspension provided with a pivot, resiliently mounted at the frame and supporting the guide members. More particularly, the invention is concerned with an independent wheel suspension for motor cars in which the guide members, for example two guide links arranged one above the other and serving to guide the wheel, are supported by a pivot which, for example, may yield about a vertical axis and is mounted substantially vertically on the frame. In wheel suspensions of this kind it is difficult to so exactly construct the individual members of the frame and of the wheel suspension that, after assembling the vehicle frame, the arrangements of the wheel suspensions of the two wheels of a pair of wheels are consistent with one another and that the wheels or the steering swivel journals of same respectively occupy a strictly equal and prescribed position. If this is not the case, an undesired non-uniform guidance of the two wheels may under circumstances occur, by which the position of the vehicle relatively to the road and the safety of steering are influenced.

Now, the object of the invention is to provide an arrangement which allows a simple and suitable adjustment of the supporting pivot and thereby of the wheel suspension. Simultaneously the invention ensures a safe and suitable absorption of all forces occurring at the supporting pivot.

The invention consists in journalling the vertical supporting pivot in adjustable bearings on the frame, more particularly in such a manner that the axial direction of the supporting pivot may be adjusted. To this end the bearings for the supporting pivot, for example, are provided with ball-like bearing surfaces and may be adjusted in a transverse direction or they are so formed that they may later on, during mounting of the supporting pivot on the frame, be connected to the latter in an adjustable position. Owing to the ball-like bearing surfaces of the bearings the pivot may unconstrained and freely adjust itself in any position. Preferably the bearings simultaneously serve the purpose of absorbing axial forces occurring at the supporting pivot. The one bearing preferably comprises a ring, having a ball-like bearing surface, which, by means of a nut screwed upon the supporting pivot, is pressed in axial direction against the correspondingly ball shaped bearing surface at the frame.

The present invention, furthermore, relates to a resilient mounting of the supporting pivot according to which the pivot is journalled at the frame by means of a rubber sleeve surrounding the pivot and a metal sleeve surrounding the rubber sleeve and adapted to be inserted into the frame. Hereby the rubber may be biased and adherently connected to the metal members making contact with this rubber sleeve. By this arrangement, allowing a simple assembly and a simple adjustability, any transmission of shocks upon the frame is practically obviated. More particularly, it is hereby easily possible to obtain an arrangement in which the supporting pivot may be mounted on the frame in a manner to yield in all directions in which, however, resiliency mainly is given in the direction of rotation about the axis of the pivot. Moreover, the axial forces may be absorbed by the cooperation of the entire relatively long rubber sleeve. The adjustment of the supporting pivot preferably is effected by adjustment of the bearings provided at the frame for the metal sleeve.

Furthermore, of particular importance is an arrangement of the supporting pivot in such a manner that it vertically extends through a hollow member of the frame, for instance a vertical tube sleeve welded to a longitudinal beam and a transverse beam of the frame, whereby one or both ends of the tube- or box-like frame member may project beyond the plane of the frame to ensure safe mounting of the supporting pivot. Simultaneously a suitable stiffening or reinforcing of the frame is hereby obtained at that point at which the wheel forces are transmitted to the frame. Simultaneously the supporting pivot may in a simple manner be journalled and adjusted by providing the upper and lower side of the hollow frame member with horizontal flanges upon which the bearings for the supporting pivot are mounted in the manner of a cap or cover.

In the accompanying drawing two constructions according to the invention are shown by way of example.

Figure 2:
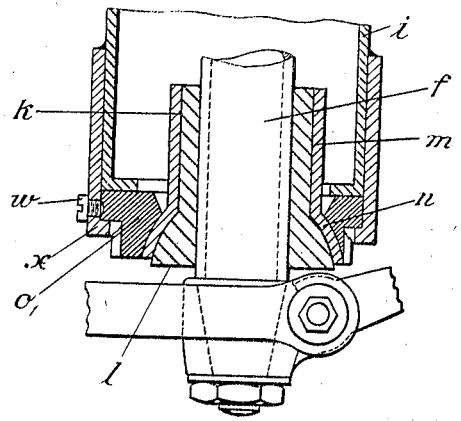

In this drawing:

Fig. 1 shows a broken away view partly in section of a wheel suspension according to the invention; and Fig. 2 shows a detail view of a modified mounting of the supporting pivot in vertical section.

The wheel support $a$ is guided by the two guide links $b$ and $c$. The upper link $b$ and the lower link $c$ are linked to an upper bearing member $d$ and a lower bearing member $e$ respectively. The bearing members $d$ and $e$ are rigidly connected to the vertical supporting pivot $f$ which is arranged in the frame in the manner to be described presently.

The frame consists of box-like longitudinal beams $g$ and box-like transverse beams $h$. At the point of connection of the front transverse beam to the frame, a vertical tube member $i$ is fixed by welding which upwardly and downwardly extends beyond the plane of the frame and the open ends of which are provided with horizontal flanges.

As may be seen from Fig. 1 the supporting pivot $f$ extends in a vertical direction through the tube member $i$ of the frame. The entire length of the supporting pivot $f$ between the bearing members $d$ and $e$ is surrounded by a rubber sleeve $k$, the lower end of which is provided with a ball-like collar $l$. The rubber sleeve $k$ in turn is surrounded by a metal sleeve $m$ provided with a lower ball-like collar surface $n$. The rubber sleeve $k$ may, more or less biased, be inserted into the intermediate space between the pivot $f$ and the metal sleeve $m$, or this rubber sleeve may adherently be connected, by a method known per se, to one or the other surface of the pivot or the metal sleeve in contact with it, or with both members respectively. To support the ball-like collar surface $n$ of the metal sleeve upon the frame, a bearing $o$ with a corresponding ball-like bearing surface is provided which in the manner of a cap or cover is mounted from below upon the lower end flange of the tube member $i$ of the frame. The vertical forces occurring at the frame, particularly the weight of the car body and of the frame, are, by way of the supporting surface of the bearing $o$, transmitted upon the metal sleeve $m$ and from there, by way of the rubber sleeve, upon the vertical supporting pivot. To axially fix the metal sleeve and thereby the supporting pivot, a nut $p$ is screwed upon the upper end of the metal sleeve and this nut forces a ball-like intermediate ring $q$ against a correspondingly formed bearing surface of a bearing $r$ mounted upon the upper end flange of the frame sleeve or tube member $i$ in the manner of a cap or cover. The cap- or cover-like bearings $o$ and $r$ are so arranged that their connection to the frame may be effected during assembling of the wheel suspension, so that inexactnesses in the manufacture of the frame may be compensated by a corresponding adjustment of the bearings $o$ and $r$ in a horizontal plane and by fixing these bearings in the adjusted position to the end flanges of the tube member $i$. The ball-like bearing surfaces of the collar $n$ and the intermediate ring $q$ respectively allow an unconstrained adjustment into any position of the metal sleeve $m$ and therewith of the vertical supporting pivot $f$. The connection of the bearings $o$ and $r$ respectively to the lower and upper end flanges respectively of the tube member or frame sleeve $i$ may be effected by screws, preferably, however, by welding, because after the assembly an adjustment as a rule is not required.

To absorb shocks of the wheel a coiled spring $s$ is provided which is not guided and the ends of which bear against the lower guide link $c$ and the bearing member $d$ of the upper guide link $b$ respectively. Within the coiled spring $s$ for instance an hydraulic shock absorber $t$ is mounted which for instance also carries a stop $u$ for limiting the stroke of the wheel.

To support the pivot $f$ about the vertical axis, the lower bearing member $e$ is provided with arms which for instance in a manner known per se bear against rubber buffers $v$ provided at the frame. The pivot $f$ may, however, be supported about the vertical axis in any other desired member.

According to the construction shown in Fig. 2, illustrating only the lower bearing of the supporting pivot $f$, the metal sleeve $m$ is mounted by means of its ball-like collar $n$ in an eccentric $o_1$ serving as bearing which in the direction of rotation may be adjusted about its axis in the tube member or frame sleeve $i$. Depending on the eccentricity the position of the supporting pivot $f$ may more or less be changed. As a rule, a slight adjustability will be sufficient. To fix the eccentric, a screw $w$ for instance is provided which couples the eccentric in the desired position of rotation to the tube member or sleeve $i$ or for instance to a cap $x$ adapted to be rigidly connected to the sleeve $i$.

In the same manner the upper bearing $r$ may be so constructed as to be capable of being adjusted. However under certain circumstances it will be sufficient if one of the bearings only is adjustable in a horizontal plane. Instead of effecting the adjustment by an eccentric, an adjustment may, for instance, also be obtained by bearings which for instance may be transversely shifted by mounting the same in an adjustably slidable plate. The arrangement may hereby be such, that one of the bearings, for instance the lower bearing, may be shifted transversely to the direction of drive and the other, for instance the upper bearing, in the direction of drive, whereby simultaneously an independent adjustment of the tread on the one hand and of the clearance angle of the steering swivel journal on the other hand is possible.

The adjustable arrangement of the supporting pivot may also be provided without the use of the intermediate rubber sleeve $k$. Moreover, the rubber members could be arranged outside the adjusting members, but the construction shown results in a particular suitable and simple arrangement. Eventually the rubber sleeve $k$ may also be used in connection with supporting pivots which are not adjustable.

Having now particularly described and ascertained the nature of my said invention and in what manner the same is to be performed I declare that what I claim is:

1. In a vehicle having a frame, a wheel support, a pair of links positioned one above the other each pivotally connected at one end to said wheel support, a vertically extending pivot, means for attaching the other ends of said links to said pivot, and means for journalling said pivot to said frame for movement about a substantially vertical axis, said means including a hemispherical bearing surface attached to one end of said pivot and a hemispherical socket for said bearing surface on said frame, said hemispherical members cooperating to permit the relative position of said pivot and frame to be adjusted by movement of said bearing surface in said socket.

2. The combination according to claim 1, in which said socket comprises a rotatable bearing ring eccentric to the axis of said pivot.

3. In a vehicle having a frame, a wheel support, a pair of links positioned one above the other and pivotally connected at one end to said wheel support, a vertically extending pivot having a hemispherical bearing surface attached thereto at one end, means for attaching the other ends of said links to said pivot, a hollow sleeve on said frame surrounding said pivot, having a flange at one end, and a socket for said hemispherical bearing surface, comprising a rotatable bearing ring eccentric to the axis of said pivot and supported on said sleeve by said flange.

4. In a vehicle having a frame, a wheel support, a pair of links positioned one above the other and pivotally connected at one end to said wheel support, a vertically extending pivot, means for attaching the other ends of said links to said pivot, a metal sleeve surrounding said pivot, a rubber sleeve pressed intermediate said metal sleeve and said pivot, and means for journalling said metal sleeve to said frame for movement about a substantially vertical axis, said means including further means for effecting relative changes in the position of at least one end of said pivot relatively to said frame.

5. In a vehicle having a frame, a wheel support, a pair of links positioned one above the other and each pivotally connected at one end to said wheel support, a vertically extending pivot, means for attaching the other ends of said links to said pivot, a metal sleeve surrounding said pivot, a rubber sleeve pressed intermediate said metal sleeve and said pivot, and bearings on said frame for journalling said sleeve for movement about a sustantially vertical axis, one of said bearings comprising an eccentric adjustable ring.

6. In a vehicle having a frame, a wheel support, a pair of links positioned one above the other and pivotally connected at one end to said wheel support, a vertically extending pivot, means for attaching the other ends of said links to said pivot, a metal sleeve surrounding said pivot, a rubber sleeve pressed intermediate said metal sleeve and said pivot, a hollow sleeve on said frame surrounding said metal sleeve and provided with a flange at one end, and an adjustable eccentric bearing ring supported by said flange and serving as a bearing for said metal sleeve.

7. In a vehicle having a frame, a wheel support, a pair of links positioned one above the other and pivotally connected at one end to said wheel support, a vertically extending pivot, means for attaching the other ends of said links to said pivot, a metal sleeve surrounding said pivot, a rubber sleeve intermediate and vulcanized to both said metal sleeve and said pivot, one end of said rubber sleeve and metal sleeve being in the form of a ball joint, and means for journalling said metal sleeve on said frame for movement about a substantially vertical axis, including means for seating said ball joint.

SIEGFRIED WULFF.